United States Patent [19]

Marlowe

[11] Patent Number: 6,025,976
[45] Date of Patent: Feb. 15, 2000

[54] METHOD AND APPARATUS FOR MAGNETIC RECORDING USING AN INDUCED PLASMA DISCHARGE

[75] Inventor: Christian P. Marlowe, Boulder, Colo.

[73] Assignee: Quetico Technologies, Inc., Cherry Hills Village, Colo.

[21] Appl. No.: 08/919,810

[22] Filed: Aug. 29, 1997

Related U.S. Application Data

[60] Provisional application No. 60/025,113, Aug. 30, 1996.

[51] Int. Cl.[7] .................................................. G11B 5/127
[52] U.S. Cl. ............................................ 360/110; 360/113
[58] Field of Search .................................... 360/113, 128, 360/110; 324/249, 252, 207.21

[56] References Cited

U.S. PATENT DOCUMENTS

| | | | |
|---|---|---|---|
| 4,879,610 | 11/1989 | Jove et al. | 360/113 |
| 5,272,582 | 12/1993 | Shibata et al. | 360/113 |
| 5,465,186 | 11/1995 | Bajorek et al. | 360/113 |
| 5,748,412 | 5/1998 | Murdock et al. | 360/113 |
| 5,761,009 | 6/1998 | Hughbanks et al. | 360/113 |

*Primary Examiner*—Allen T. Cao
*Attorney, Agent, or Firm*—Sheridan Ross P.C.

[57] ABSTRACT

The recording head of the present invention forms flux reversals in a recording medium by a discharge of electric current. The electric discharge, proportional to the magnitude of the current, forms a magnetic field which induces the flux reversals in the recording medium.

24 Claims, 8 Drawing Sheets

METHOD AND APPARATUS FOR MAGNETIC RECORDING USING AN INDUCED PLASMA DISCHARGE

This application claims priority from U.S. Provisional application entitled "METHOD AND APPARATUS FOR MAGNETIC RECORDING USING ELECTROSTATIC DISCHARGE", having Ser. No. 60/025,113 and filed Aug. 30, 1996, which is fully incorporated herein by this reference.

FIELD OF THE INVENTION

The present invention is directed generally to a method and apparatus for magnetically recording information and specifically to a method and apparatus for magnetically recording information using an induced plasma discharge.

BACKGROUND OF THE INVENTION

A common technique for recording information is to impart a magnetic flux onto a magnetic tape or disk (media) using an inductive magnetic head. The magnetic head includes a magnetic core either for guiding a concentrated magnetic field to record (and/or erase) information or for sensing (reading) the magnetic flux of the recorded media. The magnetic head will typically include a winding for generating the concentrated magnetic field.

In designing a magnetic head, there are a number of design considerations. First, the magnetic head should be capable of recording information on as small a track width as possible. As will be appreciated, the size of the track is indirectly related to the number of bits of information that can be recorded on a storage medium. Thus, the size of the magnetic head is directly related to the number of bits of information that can be recorded by the magnetic head. Second, the magnetic head should not suffer from domain limitations that can limit the minimum track width. Third, the magnetic head should have a relatively low signal loss and noise level. Finally, the magnetic head should be relatively inexpensive and reliable. The magnetic head should therefore be easy to manufacture and have a generally low cost. (The materials used such as platinum, diamond-like carbon and conductive ceramics are not low cost when traditionally considered.)

There is a need for a magnetic recording head capable of recording a large number of bits of information. A related need is for a small recording head and/or a recording head that can record and/or write information on a relatively small track width.

There is a need for a recording head having a relatively low signal loss and noise level.

Finally, there is a need for a relatively inexpensive and reliable recording head. Related needs are for a recording head that is easy to manufacture.

SUMMARY OF THE INVENTION

These and other needs are addressed by the recording head of the present invention. The recording head includes (i) an electrical discharge device for generating an electric discharge and (ii) a biasing device (e.g., a signal generator) in electrical contact with the electrical discharge device for biasing the electrical discharge device to generate the electric discharge. The magnetic field from the electric discharge induces a magnetic flux in a recording medium, such as a tape or disk.

The electrical discharge device can be a pair of spaced apart conductors connected to the biasing device. "Conductors" refer to any conductive or superconductive material. The design of the conductors is such to reduce capacitive coupling between the conductor traces to a minimum. Gap spacing between the conductors ranges from about 1 to 0.1 microns. This, however, is dependent upon the current capabilities of lithographic techniques. The gap width generally represents the smallest track width on the storage medium for which the head can record bits of information. The conductors preferably have a low resistance and may be conductive ceramics such as indium oxide and ruthenium oxide, high melting temperature metals, such as platinum, iridium and tantalum or alloys, composites or amalgams of materials that exhibit properties suited for arcing.

The biasing device can be signal generator or other voltage source providing a bipolar waveform. As will be appreciated, the bipolar waveform permits the direction of the electric discharge to be varied to form magnetic fluxes of differing orientations (i.e., flux reversals) for information storage.

The recording head offers a number of potential advantages relative to conventional magnetic recording heads. The gap between the conductors can be relatively small, thereby providing a significantly increased track density (and greater information storage capacity) compared to that for conventional heads. The head does not suffer from domain limitations. The head can have a relatively low signal loss and noise level through the use of low resistivity conductive or superconductive materials to generate the electric discharge. Even rather high coercivity materials can be written at modes current levels. The head can have a relatively simple design, compared to conventional heads, and can be easier to manufacture than conventional heads. As a result, the head can be less expensive and have a higher degree of reliability than conventional heads. The head eliminates the multiple windings and return magnetic path, or flux guides, of conventional heads. The head can eliminate the gap height loss and "pole tip" saturation of conventional heads by placing the writing current (i.e., the electrostatic discharge) at the surface of the storage medium.

The recording head can include a dielectric or electrically insulating substrate supporting the spaced-apart conductors. The substrate forces the discharge to occur at the surface of the media so that a sharp magnetic transition might be written in the storage medium to record bits of information. The substrate preferably has a dielectric constant much greater than air.

The recording head can further include a dielectric or electrically insulating material overlying the spaced-apart conductors for guiding the electric discharge between the conductors and assuring that arcing takes place at a desired location between the conductors. Opposing portions of the conductors are exposed to provide a location for arcing to occur. The dielectric constants of the substrate and overlying material are greater than the dielectric constant of the ambient atmosphere (e.g., air) to force the electric discharge to form at the exposed portions of the conductors and not elsewhere along the length of the conductors. The exposed portions of the conductors are adjacent to the recording medium. The material preferably has a dielectric constant much greater than air and is selected from the group consisting of alumina oxide, alumina nitride, diamond like carbon, traditional semi-conductor based dielectrics and mixtures and composites thereof.

The method of operation of the recording head of the present invention includes the steps of: (i) electrically biasing the spaced apart conductors with a voltage to pass an electric discharge between the conductors and (ii) applying a magnetic field to the recording medium when the electric discharge passes between the conductors.

When different bits of information are stored, the electrically biasing step can include the further substeps of: (a) first biasing the spaced apart conductors with a positive voltage to form a first magnetic field having a first orientation and (b) second biasing the spaced apart conductors with a negative voltage to form a second magnetic field having a second orientation. The first orientation differs from the second orientation.

DETAILED DESCRIPTION

The recording head of the present invention employs Coulomb's Law to record bits of information on a recording medium. The recording head causes discharge of electrical current to occur between spaced-apart conductors, which induces a magnetic field proportional to the intensity of the current of a desired orientation in close proximity to the recording medium. A magnetic "flux reversal" of the desired orientation is thereby formed in the medium.

Figure 1:
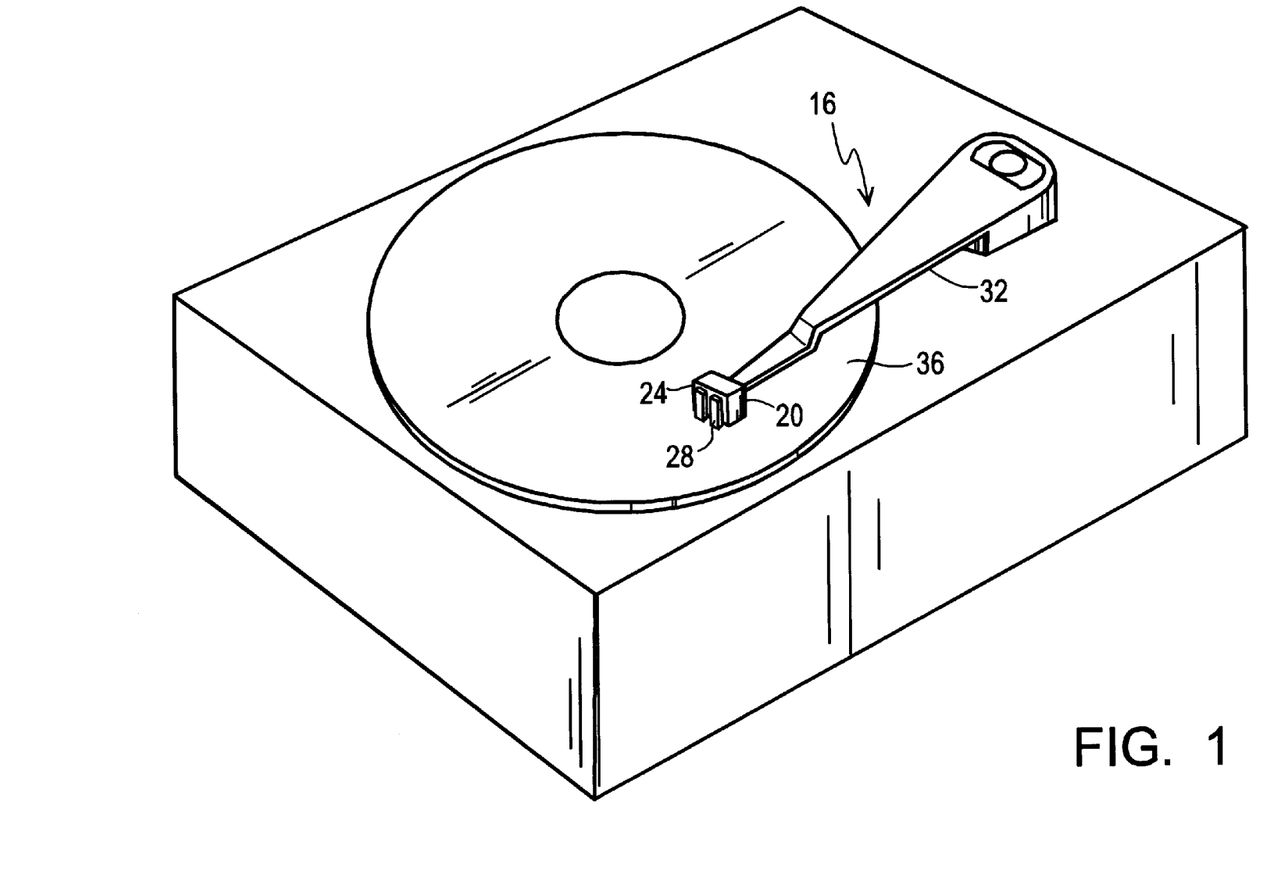
FIG. 1 depicts the recording head of the present invention being used to record data on a magnetic disk.
Figure 2:
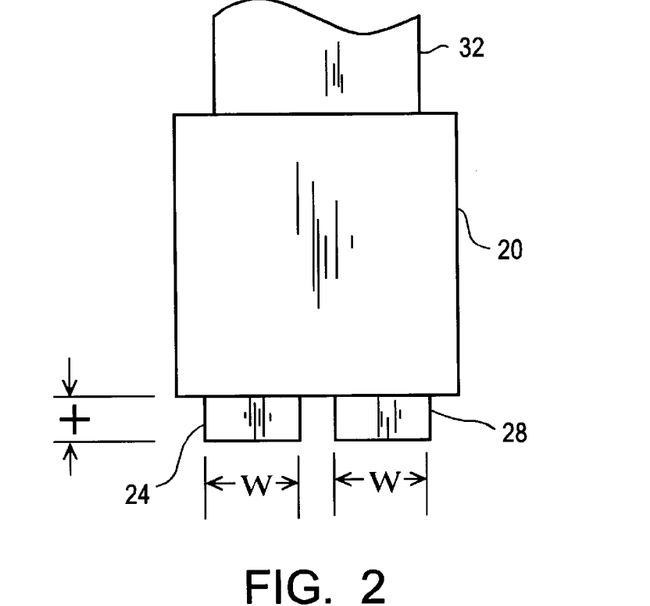
FIG. 2 is a plan view of the recording head of the recording head of FIG. 1.
Figure 3:
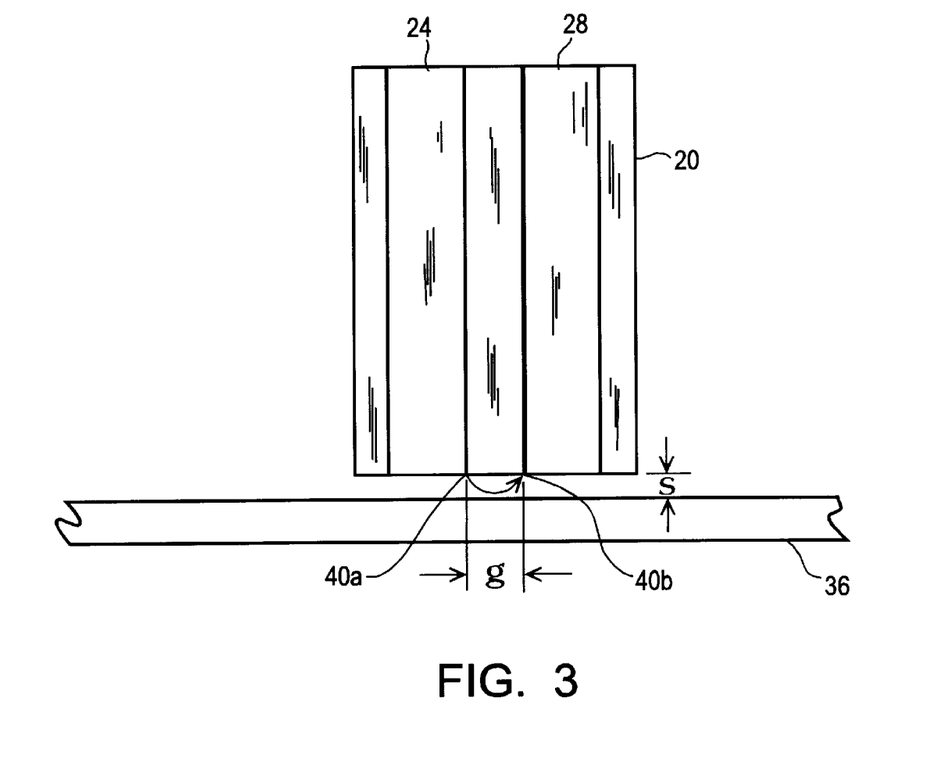
FIG. 3 is a front view of the recording head of FIG. 1.

FIGS. 1–3 depict a first embodiment of a recording head according to the present invention. The recording head 16 includes a dielectric substrate 20 supporting spaced-apart conductors 24 and 28 mounted on a rotatable arm 32. The recording head 16 is suspended above the recording medium 36 during recording of information onto the medium 36. The suspension can be accomplished by conventional techniques.

The dielectric substrate 20 forces the discharge of current to a defined region, thus focusing the magnetic field in such a fashion to write a sharp magnetic transition into the medium 36. While not wishing to be bound by any theory, it is believed that the magnetic field between the head and the medium 36 resembles that of two parallel, spaced-apart conductors having nearly equal currents flowing in the same direction while the magnetic field in the dielectric substrate resembles that of a very small current. Accordingly, the strength of the portion of the magnetic field located between the lower surface of the head and the upper surface of the medium is greater than the strength of the portion of the magnetic field located in the dielectric substrate. The dielectric substrate has a relatively high dielectric constant, preferably more than that of the ambient atmosphere. Suitable materials include glass, traditional semi-conductor substrates and polyimides such as kapton.

The conductors 24 and 28 must have a relatively high melting temperature as to accommodate the generally understood characteristics of current arcing and electric discharge (i.e., preferably a melting temperature of at least about 1,500° C.), a high reluctance to the formation of insulating oxides, and a relatively high conductivity. Suitable conductive materials include conductive ceramics such as indium oxide and ruthenium oxide, high melting temperature metals, such as platinum, iridium and tantalum or alloys, composites or amalgams of materials that exhibit properties suited for arcing.

The gap spacing "g" between the conductors 24 and 28 represents the data track width of the medium 36. The gap spacing is desirably relatively small to optimize the bit storage capacity of the medium. The gap spacing is preferably no more than about 2 microns, more preferably no more than about 1 micron, and most preferably no more than about 0.5 micron.

The conductors 24 and 28 have a width "w" that is also relatively small because the plasma discharge emanates from the inside edges 40a,b of the conductors 24 and 28. Preferably, the width is no more than about 0.5 micron, more preferably no more than about 0.35 micron, and most preferably no more than about 0.25 micron.

The spacing "s" above the upper surface of the recording medium 36 and the lower surface of the conductors 24 and 28 in the head must be small enough to permit the magnetic field induced by the electric discharge to induce a magnetic flux in the medium 36. For a traditional non-conductive medium 36, the spacing preferably ranges from being in contact to about 10 micro inches above the medium.

The conductors 24 and 28 are connected to a signal generator or other voltage source (not shown). Although the voltage source can be any suitable biasing device, a signal generator generating a bipolar waveform, designed to maximize current and minimum power consumption, is preferred. The bipolar waveform is configured to represent the ones and zeros associated with magnetic recording where a one is represented by a positive flowing current and a zero by a negative flowing current, thereby defining magnetic fluxes of different orientations in the medium 36. The current, when generated, bridges the gap by forming the electric discharge, depending upon the characteristics of the gap between the conductors 24 and 28.

Figure 4A:
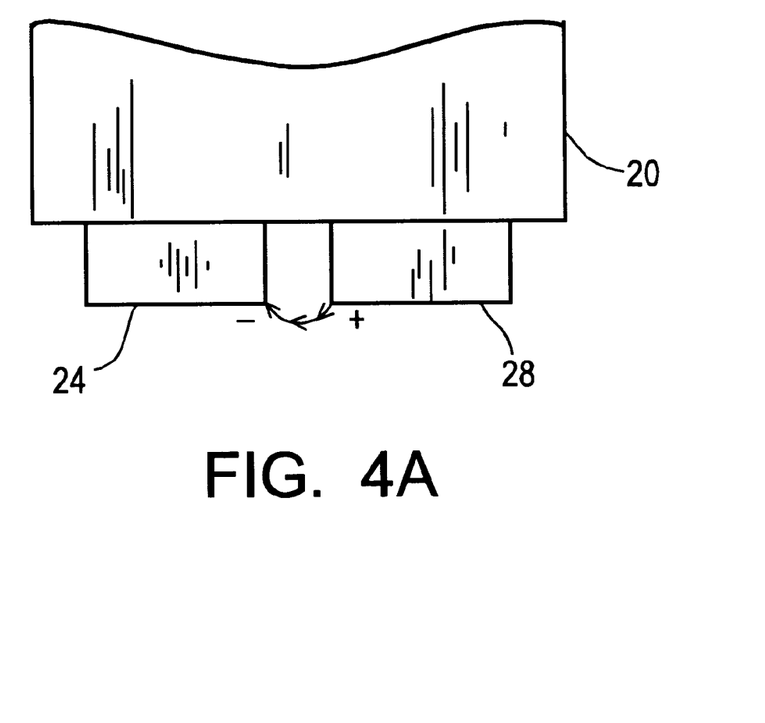
FIG. 4A depicts an electric discharge between the opposing conductors of the recording head of FIG. 1.
Figure 4B:
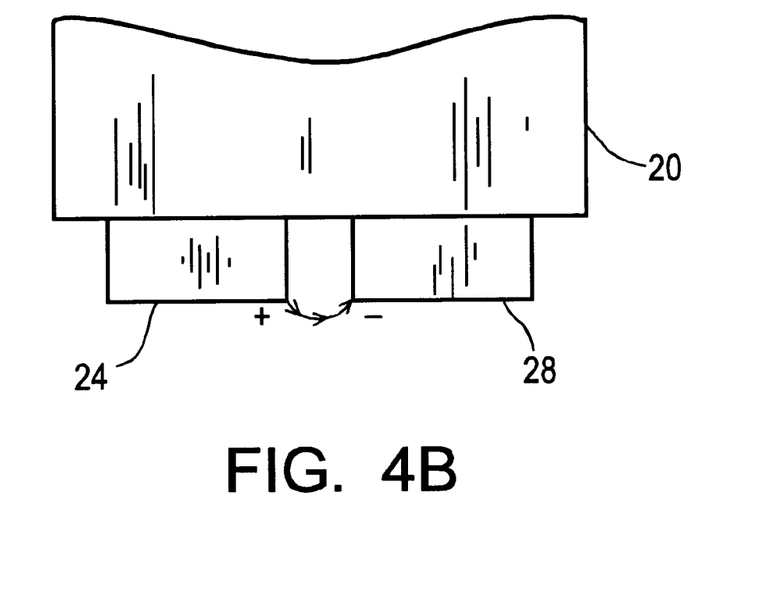
FIG. 4B depicts an electric discharge in a direction opposite the discharge of FIG. 4A.
Figure 5A:
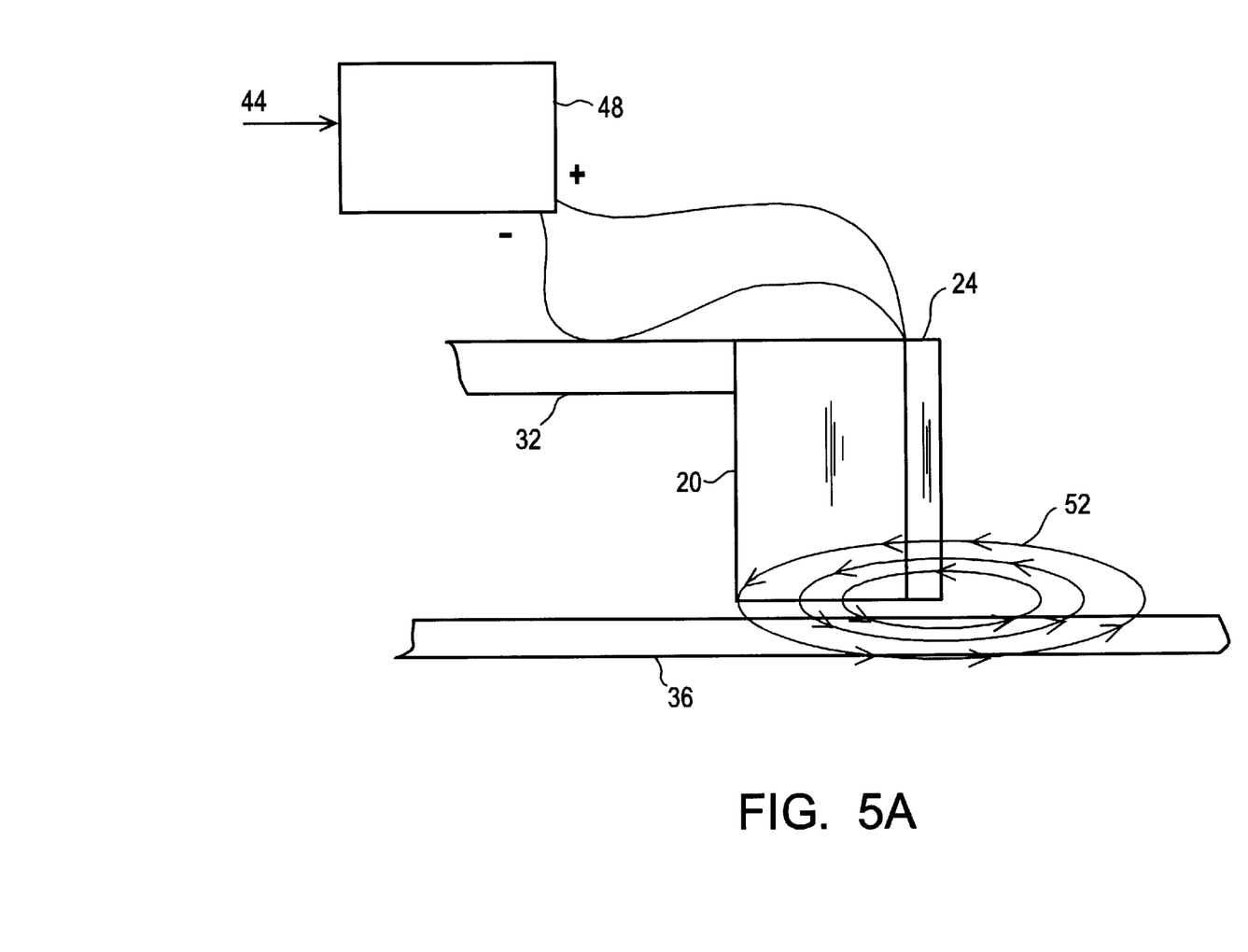
FIG. 5A depicts a magnetic field induced by the electric discharge of FIG. 4A.
Figure 5B:
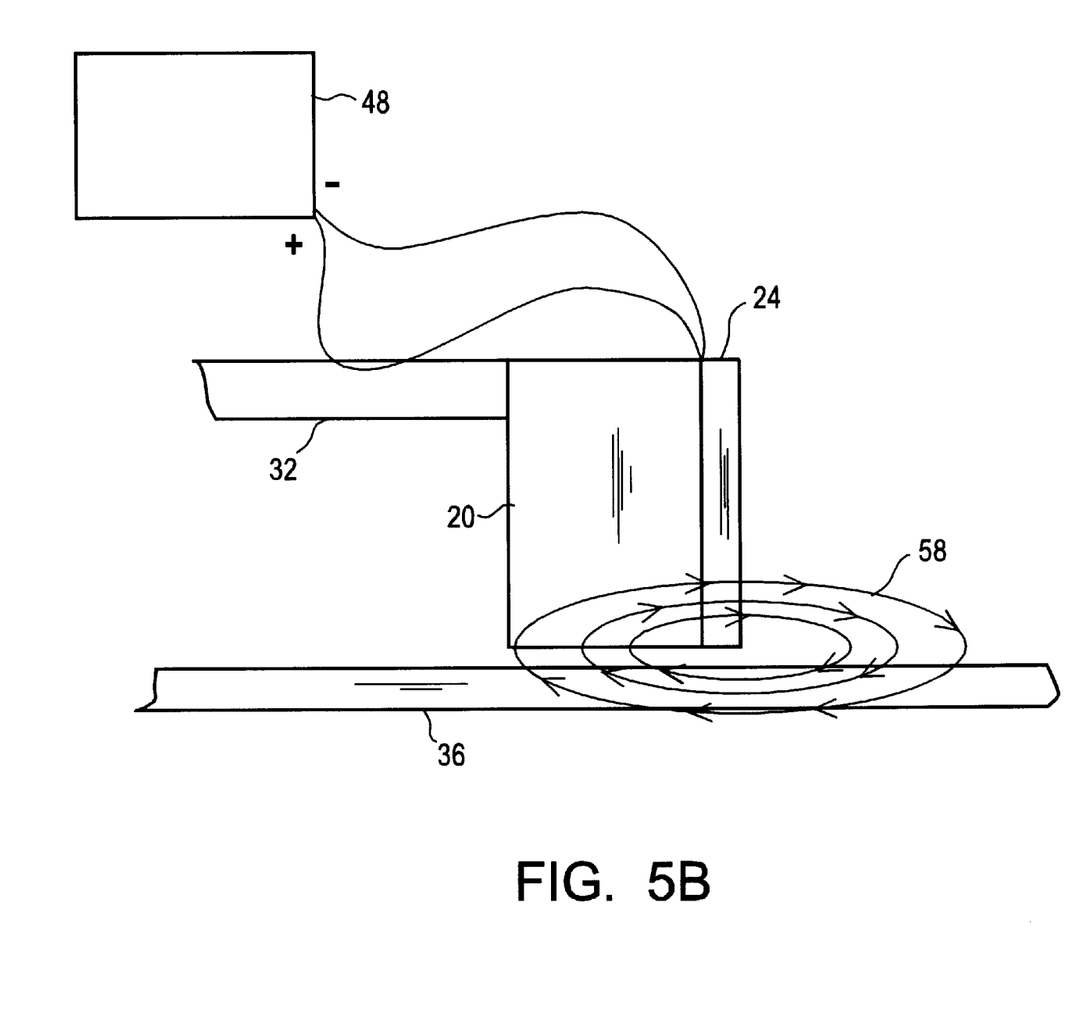
FIG. 5B depicts a magnetic field induced by the electric discharge of FIG. 4B.
Figure 6:
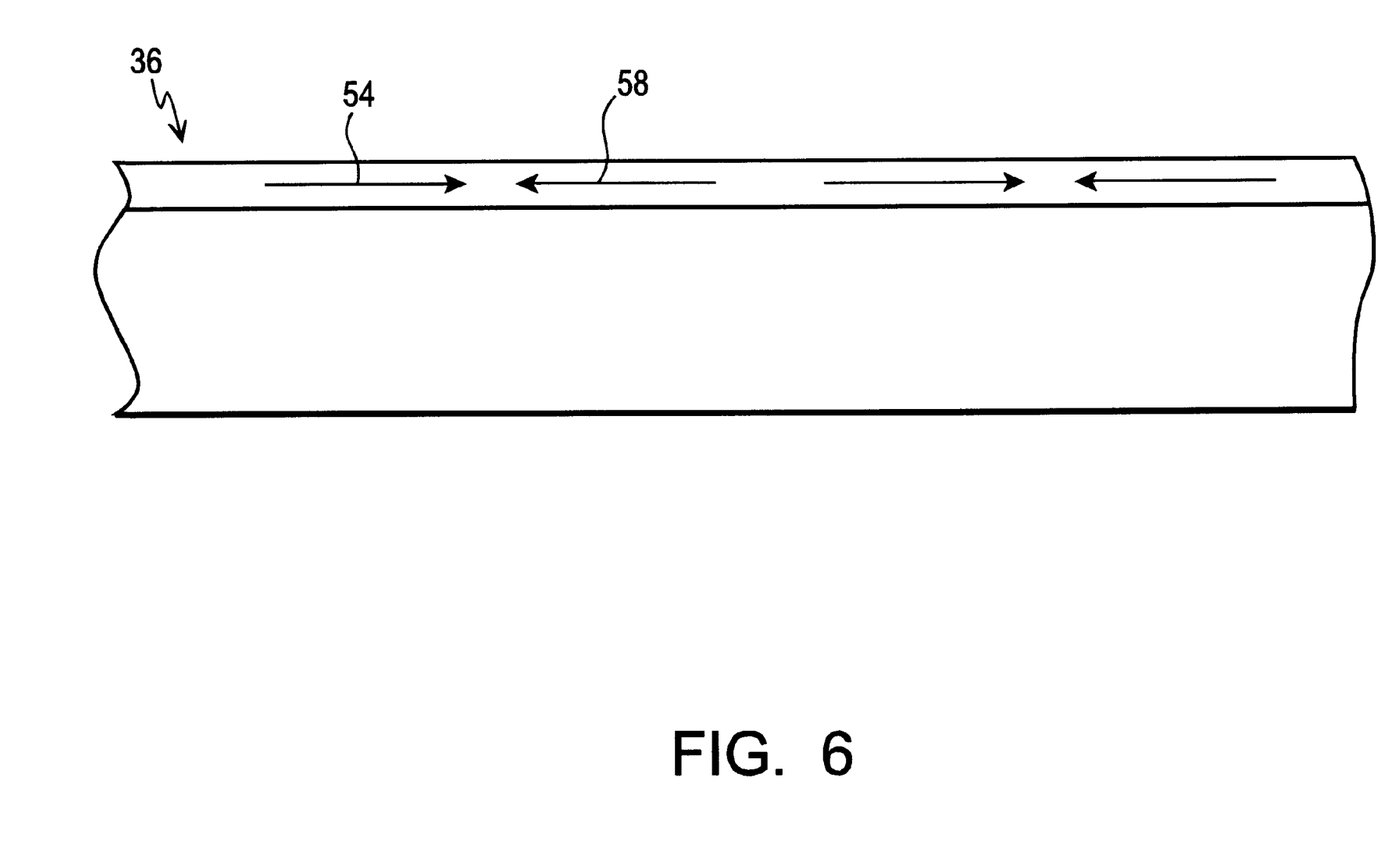
FIG. 6 depicts magnetic fluxes of differing orientations in a recording medium.
Figure 7A:
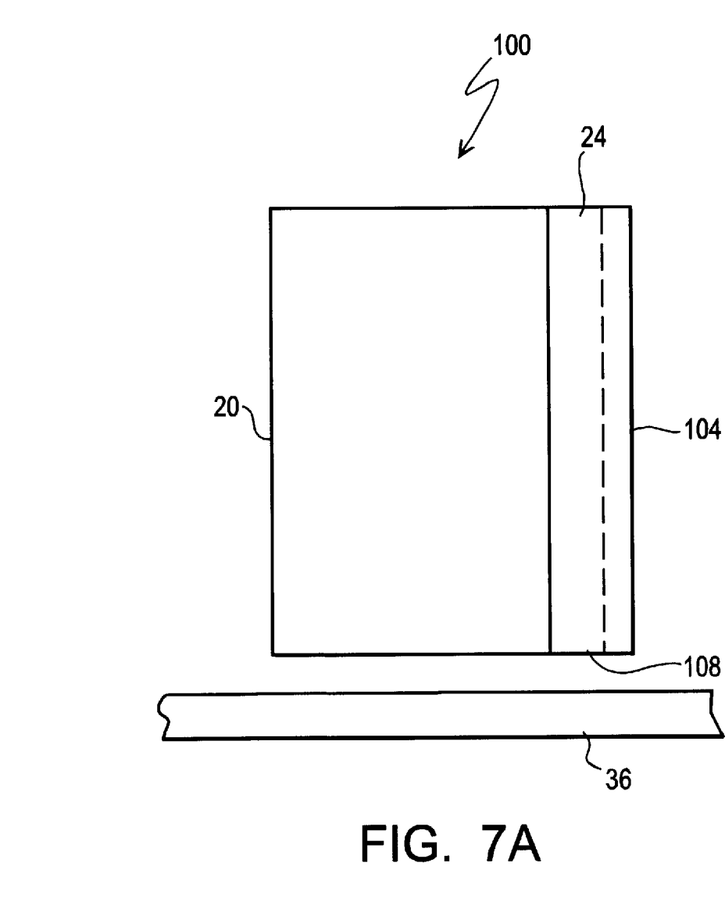
FIG. 7A depicts a side view of a second embodiment of a recording head.
Figure 7B:
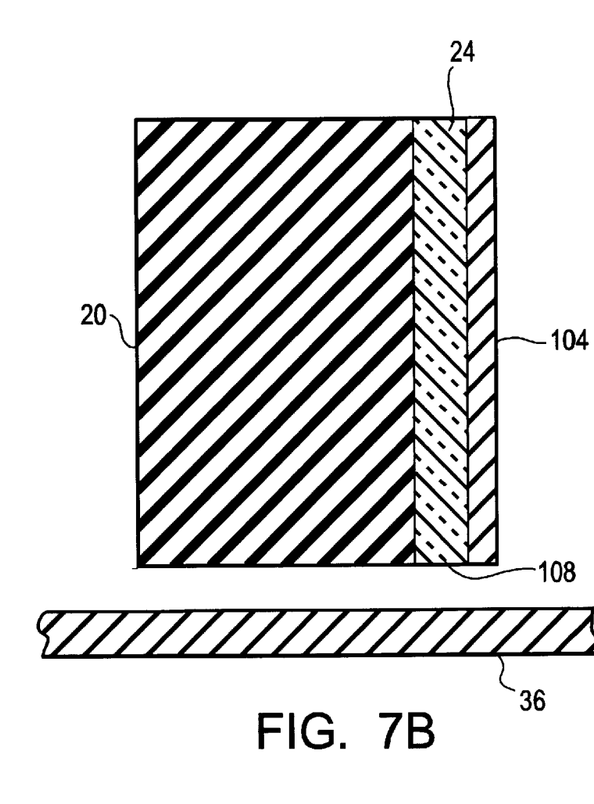
FIG. 7B depicts a cross-sectional view of the recording head of FIG. 7A taken along line 7B—7B of FIG. 8.
Figure 8:
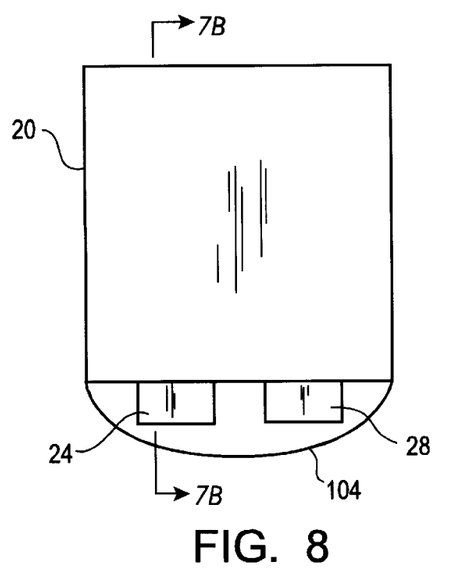
FIG. 8 depicts a plan view of the recording head of FIG. 7A.
Figure 9:
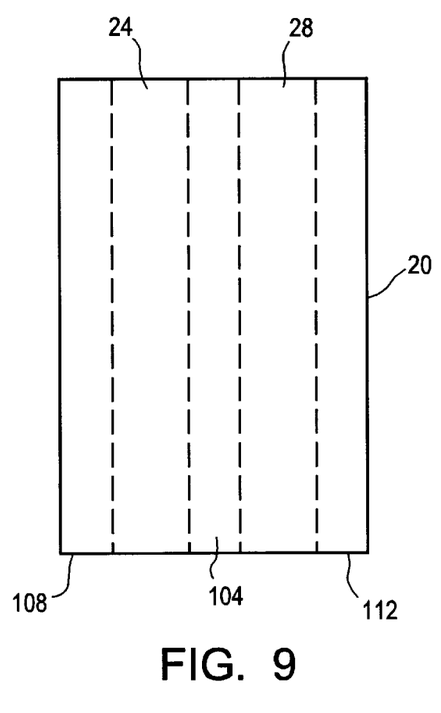
FIG. 9 is a front view of the recording head of FIG. 7A.

The operation of the recording head will be discussed with reference to FIGS. 4A through 6. To record a bit of information, a control signal 44 is transmitted to the voltage source 48 which then biases the conductors 24 and 28 appropriately. For example, with reference to FIGS. 4A and 5A, the voltage source 48 in a first state applies, in response to a first control signal, a positive voltage to form a first magnetic field 52 having a first orientation. The first magnetic field 52 forms in the medium 36 a first magnetic flux 54 having the first orientation. With reference to FIGS. 4B and 5B, the voltage source 48 in a second state applies, in response to a second control signal, a positive voltage to form a second magnetic field 58 having a second orientation. The first orientation is opposite to the second orientation. The second magnetic field 58 forms in the medium 36 a second magnetic flux 62 having the second orientation.

While not wishing to be bound by any theory, it is believed that the electric discharge creates a current flow between the two conductors. As with all electrically induced plasmas, the current path has a resistance that approaches zero ohms and a concomitant electrical current that approaches an infinite value. The electrical current generates a magnetic field proportional to the value of the current. The power dissipated is also proportional to the current and resistance combined. As a result of this plasma, a magnetic field of a size according to Coulomb's law is generated. The magnetic field follows the right hand rule about the current flow, which, as shown in FIGS. 4A through 5B, is oriented in a circular fashion around the discharge. By altering the direction of the current flow from the signal generator, the direction of the electrical discharge is changed from first traveling from conductor 28 to conductor 24 in the first state to now traveling from conductor 24 to conductor 28 in the second state. The second state produces a field that circles the discharge in a direction that is opposite to the direction generated in the first state. In either state, the magnetic field around the discharge orientates and aligns the medium 36 in a fashion that is well understood in the art and which creates a "flux reversal." Because the plasma discharge is located near the upper surface of the medium 36, magnetic flux guides (such as those used in conventional heads) are not necessary to assure sharp flux transition in the medium 36. Once oriented, the medium 36 and the resulting sequence of flux reversals (see FIG. 6) can be sensed or read by methods which are also well understood in the art.

A preferred writing mode would be "pulse" recording. In this mode of writing, a pulsed current is generated at the point of the desired flux transition. It is then turned off for the remainder of the bit cycle. During the next bit cycle, a pulsed current of the opposite polarity may be generated. Insofar as the power at the medium interface will be the sustaining potential of the electric discharge times the current in the electric discharge, the power may be minimized by turning off the current as soon as the transition is written.

FIGS. 7A through 9 depict a second embodiment of the present invention. The recording head 100 comprises a dielectric substrate 20, a pair of conductors 24 and 28, and a dielectric insulator 104 in the gap between the conductors 24 and 28. The dielectric insulator 104 causes the electric discharge to occur at the exposed, lower ends 108 and 112 of the conductors 24 and 28 rather than at other location(s) along the conductors. To produce this result, the dielectric insulator 104 has a dielectric constant greater than that of the length of the ambient atmosphere (e.g., air) in the gap. The electric discharge is along the lower surface of the head. The dielectric insulator 104 can be alumina oxide, alumina nitride, traditional semi-conductor based dielectrics, diamond like carbon, and composites thereof.

The lower surface of the head can be polished (e.g., machined) to expose the lower ends 108 and 112 of the conductors 24 and 28 and insure that the lower surfaces of the dielectric insulator and the dielectric substrate conform with the upper surface of the medium 36.

While various embodiments of the present invention have been described in detail, it is apparent that modifications and adaptations of those embodiments will occur to those skilled in the art, However, it is to be expressly understood that such modifications and adaptations are in the scope of the present invention, as set forth in the following claims.

What is claimed is:

1. A recording apparatus for writing predetermined one or more binary bits when desired, comprising:

a biasing device that supplies a signal under predetermined control;

an electric discharger, responsive to said signal, that outputs an electric discharge related to at least one predetermined bit; and a recording medium, responsive to said electric discharge, that stores said at least one predetermined bit at a time which is based on said predetermined control.

2. The recording apparatus of claim 1, wherein said electric discharger comprises:

first and second spaced apart conductors with a gap defined therebetween and with said gap being related to a data track width of said recording medium.

3. The recording apparatus of claim 2, wherein said electric discharger comprises:

a dielectric material in said gap between said first and second conductors.

4. The recording apparatus of claim 3, wherein said electric discharger comprises:

a dielectric substrate supporting said dielectric material and said first and second conductors.

5. The recording apparatus of claim 4, wherein said dielectric material has a first dielectric constant and said dielectric substrate has a second dielectric constant and said first dielectric constant is less than said second dielectric constant.

6. The recording apparatus of claim 2, wherein said first and second conductors comprise a material selected from the group consisting of conductive ceramics such as indium oxide and ruthenium oxide, high melting temperature metals such as platinum, iridium and tantalum or alloys, composites or amalgams of materials that exhibit properties suited for arcing.

7. The recording apparatus of claim 3, wherein said dielectric material is selected from the group consisting of alumina oxide, alumina nitride, traditional semi-conductor based dielectrics, diamond like carbon, and mixtures and deposits thereof.

8. The recording apparatus of claim 4, wherein said dielectric substrate is selected from the group consisting of glass, traditional semi-conductor substrates and polyimides such as kapton, and mixtures and composites thereof.

9. The recording apparatus of claim 1, wherein said electric discharger comprises:

first and second spaced apart conductors that are separated by a gap and in which said at least one predetermined bit is written using said electric discharge based on an electrical path from said first conductor through said gap to said second conductor.

10. The recording apparatus of claim 9, wherein said gap is no more than about 0.5 micron.

11. The recording apparatus of claim 1, wherein said biasing device comprises:

a voltage source in electrical communication with said electric discharger.

12. A recording apparatus for writing using an electric discharge, comprising:

an electric discharger including first and second conductors separated by a gap that outputs an electric discharge;

a biasing device connected to said first and second conductors that provides power to said electric discharger; and a recording medium responsive to said electric discharge and having a surface on which data is written;

wherein a distance is defined between said surface of said recording medium and said first and second conductors that is unoccupied and in which at least one predetermined bit is written on said surface of said recording medium using said electric discharge based on an electrical path from said first conductor through said gap to said second conductor.

13. The recording apparatus of claim 12, further comprising:

an electrically insulating material located between said first and second conductors.

14. The recording apparatus of claim 13, wherein said electrically insulating material has a dielectric value substantially less than air.

15. The recording apparatus of claim 13, wherein said electrically insulating material has a thickness of at least about 0.35 micron.

16. The recording apparatus of claim 12, wherein said recording medium has a plurality of tracks each having a data track width and wherein said data track width is substantially equal to said gap that separates said first and second conductors.

17. The recording apparatus of claim 13, further comprising:

an electrically insulating substrate supporting said electrically insulating material and said first and second conductors.

18. The recording apparatus of claim 13, wherein said electrically insulating material has a first dielectric constant and said electrically insulating substrate has a second dielectric constant and said first dielectric constant is less than said second dielectric constant.

19. The recording apparatus of claim 12, wherein said first and second conductors comprise a material selected from the group consisting of conductive ceramics such as indium oxide and ruthenium oxide, high melting temperature metals such as platinum, iridium and tantalum or alloys, composites or amalgams of materials that exhibit properties suited for arcing.

20. The recording apparatus of claim 13, wherein said electrically insulating material is selected from the group consisting of alumina oxide, alumina nitride, traditional semi-conductor based dielectrics, diamond like carbon, and mixtures and composites thereof.

21. The recording apparatus of claim 17, wherein said electrically insulating substrate is selected from the group consisting of glass, traditional semi-conductor substrates and polyimides such as kapton, and mixtures and composites thereof.

22. The recording apparatus of claim 12, wherein said power includes a voltage that defines a bipolar waveform.

23. The recording apparatus of claim 12, wherein said gap is no more than about 0.5 micron.

24. The recording apparatus of claim 22, wherein said voltage ranges from about 2 volts to about 24 volts.

* * * * *